United States Patent
Stephens

(10) Patent No.: US 6,769,695 B2
(45) Date of Patent: Aug. 3, 2004

(54) BACK-UP RINGS FOR HIGH PRESSURE SEALS, PACKING ASSEMBLY, AND PUMPS INCORPORATING SAME

(75) Inventor: Jeffrey D. Stephens, Pittsburg, KS (US)

(73) Assignee: KMT Waterjet Systems, Inc., Baxter Springs, KS (US)

( * ) Notice: Subject to any disclaimer, the term of this patent is extended or adjusted under 35 U.S.C. 154(b) by 0 days.

(21) Appl. No.: 10/020,523

(22) Filed: Dec. 14, 2001

(65) Prior Publication Data

US 2003/0111801 A1 Jun. 19, 2003

(51) Int. Cl.[7] .............................. F16J 15/16; F16S 15/18
(52) U.S. Cl. ........................ 277/584; 277/510; 277/529
(58) Field of Search ................................ 277/510, 511, 277/529, 530, 531, 532, 534, 584, 466, 550

(56) References Cited

U.S. PATENT DOCUMENTS

| | | | | |
|---|---|---|---|---|
| 1,546,525 A | * | 7/1925 | Wasson | 277/466 |
| 2,012,150 A | * | 8/1935 | Wheeler | 277/514 |
| 2,427,789 A | | 9/1947 | Kehle | |
| 3,811,795 A | | 5/1974 | Olsen | 417/53 |
| 4,050,701 A | * | 9/1977 | Webb | 277/422 |
| 4,433,847 A | * | 2/1984 | Weinberg | 277/342 |
| 4,451,047 A | * | 5/1984 | Herd et al. | 277/539 |
| 4,489,916 A | * | 12/1984 | Stevens | 251/214 |
| 4,516,752 A | * | 5/1985 | Babbitt et al. | 251/214 |
| 4,576,386 A | * | 3/1986 | Benson et al. | 277/584 |
| 4,973,066 A | * | 11/1990 | Duck et al. | 277/466 |
| 5,092,744 A | | 3/1992 | Boers et al. | 417/397 |
| 5,472,216 A | * | 12/1995 | Albertson et al. | 277/530 |
| 6,068,448 A | * | 5/2000 | Muratsubaki et al. | 417/44.2 |

FOREIGN PATENT DOCUMENTS

GB        1 239 154        7/1971

OTHER PUBLICATIONS

Ingersoll–Rand Streamline™ SL–IV 15 hp Waterjet Intensifier, 2 Pages, © 2000 Ingersoll–Rand Company, Form SLIV15/10/00.

* cited by examiner

Primary Examiner—Lynne H. Browne
Assistant Examiner—Michael J. Kyle
(74) Attorney, Agent, or Firm—Michael Best & Friedrich LLP

(57) ABSTRACT

An improved support for a seal is provided in the form of a back-up ring that reduces or eliminates the gaps between a pump plunger and a high pressure cylinder of a pump. The support includes a back-up ring having opposed first and second faces with a wall thickness disposed between the faces. The back-up ring includes a frustro-conical concave surface on the first face and a frustro-conical convex surface on the second face. Also provided are a packing assembly including at least one back-up ring and a reciprocating pump incorporating the at least one back-up ring.

14 Claims, 5 Drawing Sheets

US 6,769,695 B2

BACK-UP RINGS FOR HIGH PRESSURE SEALS, PACKING ASSEMBLY, AND PUMPS INCORPORATING SAME

FIELD OF THE INVENTION

The present invention relates generally to backup rings for high pressure seals used in an annular packing space between a first cylindrical member which reciprocates within a cylindrical bore of a second member, and more particularly, but not by way of limitation, to such backup rings for seals specifically designed for use in sealing a reciprocating plunger pump within a high pressure cylinder of an intensifier pump utilized for pumping fluids.

BACKGROUND OF THE INVENTION

There are in the prior art various pressure intensifying systems where a larger working piston is reciprocated to provide a high pressure output through smaller high pressure pistons or plungers that reciprocate within high pressure cylinders.

These pressure intensifying systems are useful for a variety of purposes including waterjet cutting systems having cutting heads equipped with nozzles that direct high pressure and high velocity jets of water to cut, drill, and shape workpieces. For such processes, intensifiers are used to increase the pressure of supply water to pressures above 40,000 psi. Examples of high pressure intensifiers for producing a high velocity fluid jet stream are shown and described in U.S. Pat. Nos. 3,811,795 and 5,092,744, which patents are incorporated herein by reference. The high pressure water is delivered from the intensifier to the cutting head and discharged through nozzles as waterjets which cut workpieces.

In generating the high pressures required for waterjet machining operations, however, a very difficult sealing problem is encountered at the high pressure end between the reciprocating piston or plunger and the pressure cylinder wall, particularly when very high pressures are to be generated. Typically, O-rings are used to accomplish this seal. After repeated cycling of the piston or plunger within the high pressure cylinder, however, these seals tend to leak. This leaking problem is further exacerbated by deterioration problems with the seals encountered due to the hydraulic load from the high pressure fluid end of the pump. As a result, this leads to frequent repair of these component parts which is both costly from the standpoint of replacement parts, labor intensive maintenance, and lost production due to machine downtime.

The foregoing illustrates limitations known to exist in present high pressure hydraulic devices. Thus it is apparent that it would be advantageous to provide an alternative directed to overcoming one or more of the limitations set forth above. Accordingly a support for a seal of a pump is provided including the features more fully disclosed hereinafter.

SUMMARY OF THE INVENTION

According to the present invention, an improved support for a seal is provided in the form of a back-up ring that reduces or eliminates the gaps created between a pump plunger and a high pressure cylinder of a pump when the cylinder is pressurized. The support includes a back-up ring having opposed first and second faces with a wall thickness disposed between the faces. The back-up ring includes a frustro-conical concave surface on the first face and a frustro-conical convex surface on the second face. Also provided are a packing assembly including at least one back-up ring and a reciprocating pump incorporating the at least one back-up ring.

The foregoing and other aspects will become apparent from the following detailed description of the invention when considered in conjunction with accompanying drawing figures.

DETAILED DESCRIPTION OF THE PREFERRED EMBODIMENTS

Figure 1:
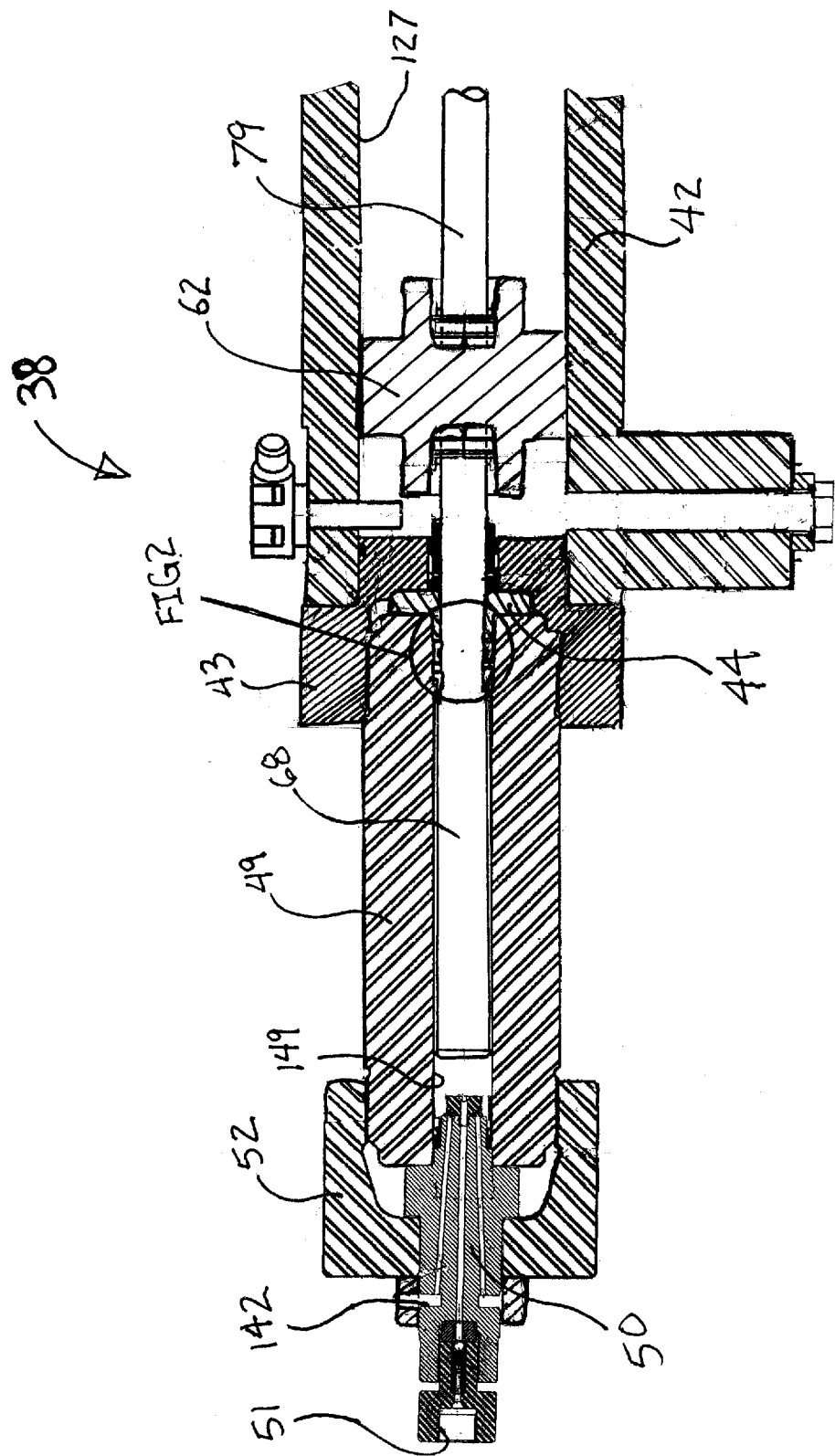
FIG. 1 is a partial cross-sectional view of a reciprocating pump in the form of a conventional pressure intensifier.

The invention is best understood by reference to the accompanying drawings in which like reference numbers refer to like parts. It is emphasized that, according to common practice, the various dimensions of component parts as shown in the drawings are not to scale and have been enlarged for clarity.

Referring now to the drawings, shown in FIG. 1 is a partial sectional view of an intensifier 38 for a water et cutting system having a central power cylinder 42 comprising a piston 62 attached to plungers 68 and 79. Piston 62 is located within a hydraulic fluid chamber 127 defined by the inside surface of power cylinder 42 upon which piston 62 slides.

Power cylinder 42 is attached to a first high pressure cylinder 49 by a head 43 that closes one end of power cylinder 42 and a retaining flange 44 that is inserted in one end of high pressure cylinder 49. To regulate the low pressure water passing into and high pressure water passing out of intensifier 38, a check valve body assembly 50 is inserted into the end of high pressure cylinder 49 and held in place by a cap 52 to define a pumping chamber 149. A similar second high pressure pump cylinder (not shown) is located adjacent the outside of a second head (not shown) attached to an opposite end of the power cylinder.

In use, hydraulic fluid is alternately supplied under pressure to opposite ends of hydraulic fluid chamber 127 of power cylinder 42 thereby reciprocating piston 62 therein. Piston 62 being connected to the plungers 68 and 79, in turn, causes the reciprocating pumping of the plungers 68 and 79. As plunger 68 moves to the left in high pressure cylinder 49, low pressure water fed from a water inlet passage 142 to pumping chamber 149 is passed out of an outlet 51 at high pressure, as is known in the art.

Figure 2:
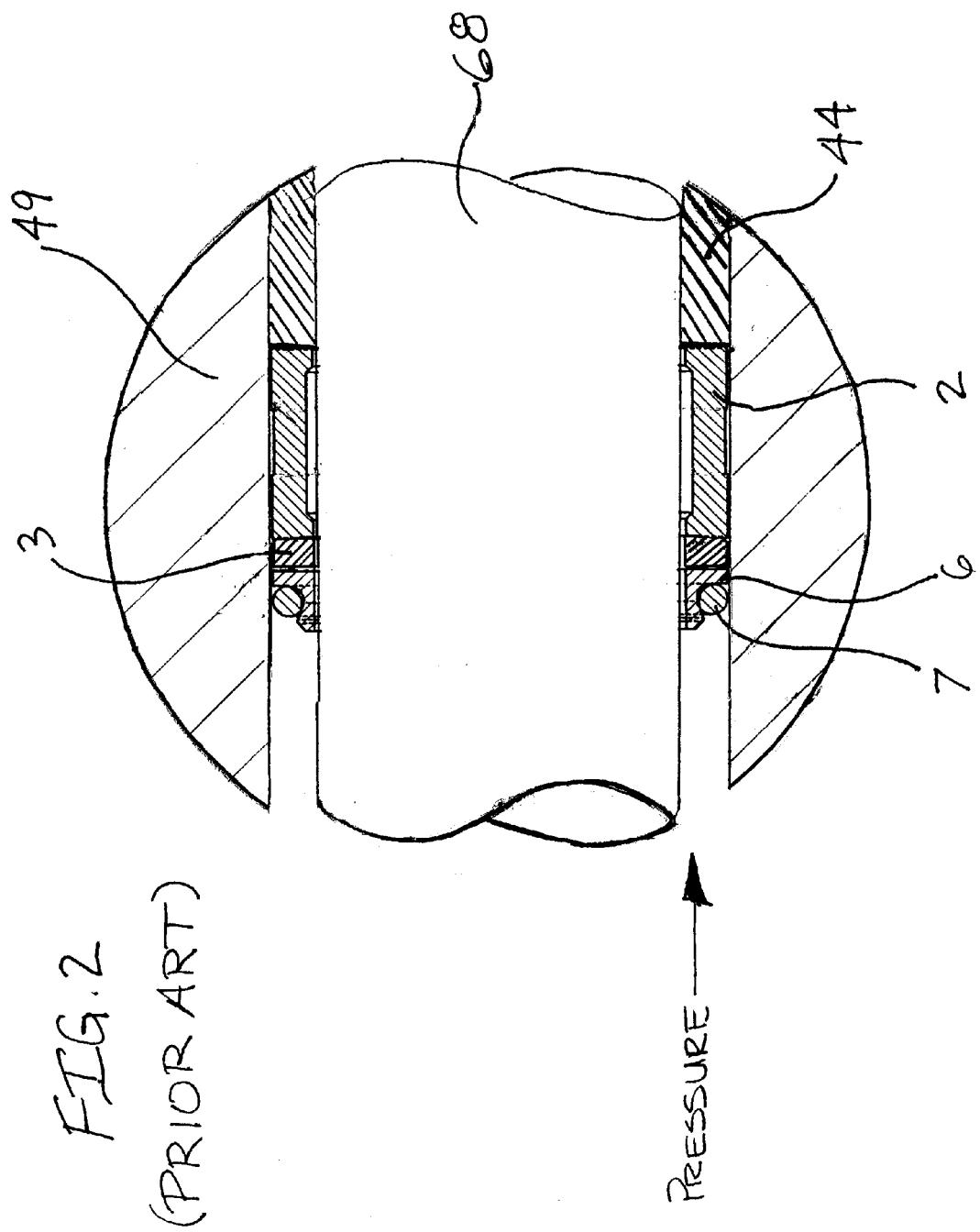
FIG. 2 is an enlarged cross-sectional view showing a conventional packing seal arrangement provided between the high pressure cylinder and plunger of the pressure intensifier shown in FIG. 1.

Shown in the enlarged view of FIG. 2, is a conventional packing seal arrangement provided between the high pressure cylinder 49 and plunger 68 to prevent leakage of pumping chamber 149. In reciprocating a moving plunger in a high pressure cylinder, the gaps between the plunger 68 and the seal 7 and between the bore of cylinder 49 and the seal 7 must be effectively sealed for the pump to operate. The conventional packing seal arrangement includes, in sequence next to retaining flange 44, a packing follower 2, a back-up ring 3, and a seal body 6 having a seal 7. Packing follower 2 is a tight tolerance ring that is usually made of brass. As shown, packing follower 2 slides over plunger 68 and between plunger 68 and the bore of high pressure cylinder 49 and provides support for the packing seal arrangement. At the opposite end of the packing seal arrangement from packing follower 2 is seal body 6 having seal 7. Typically, seal body 6 is a plastic material with seal 7 being in the form of a rubber O-ring. Between seal body 7 and packing follower 2 is a conventional back-up ring 3 having a square cross-section and typically made of an acetal copolymer. An exemplary copolymer used for the back-up ring 3 is Celcon® acetal copolymer which is a polyoxymethylene (POM) available from Ticona Engineering Polymers (Celanese AG) Summit, N.J. 07901.

With a conventional packing seal arrangement such as that shown in FIGS. 1 and 2, however, it has been discovered by the present inventor that problems are generally encountered at high pressures using back-up rings with square cross-sections. Although these back-up rings can be provided with tight tolerances to mechanically fill the static gaps between plunger 68 and seal 7 and between the bore of cylinder 49 and seal 7, this does not address the need to seal an additional gap created by an increase in the bore diameter of cylinder 49 that may occur with the application of high pressure during pumping. Thus, conventional back-up rings can permit seal extrusion and leakage to occur when exposed to high pressures.

According to the present invention an improved support for a seal is provided in the form of a back-up ring that reduces or eliminates the gaps between a pump plunger and a high pressure cylinder of a pump. Also provided are a packing assembly and a reciprocating pump incorporating the at least one back-up ring. Shown in FIGS. 3–6 is a support according to the present invention in the form of a back-up ring 4 having a first face 11 with a frustro-conical concave surface and a second 12 face having a frustro-conical convex surface. The first face and second face are opposed and define a wall thickness having a cross-sectional shape and being physically rotatable disposed between the faces. The back-up ring includes a third face 13 wherein upon pressurization, the back-up ring rotates so that the third face contacts either the plunger or the cylinder.

Figure 3:
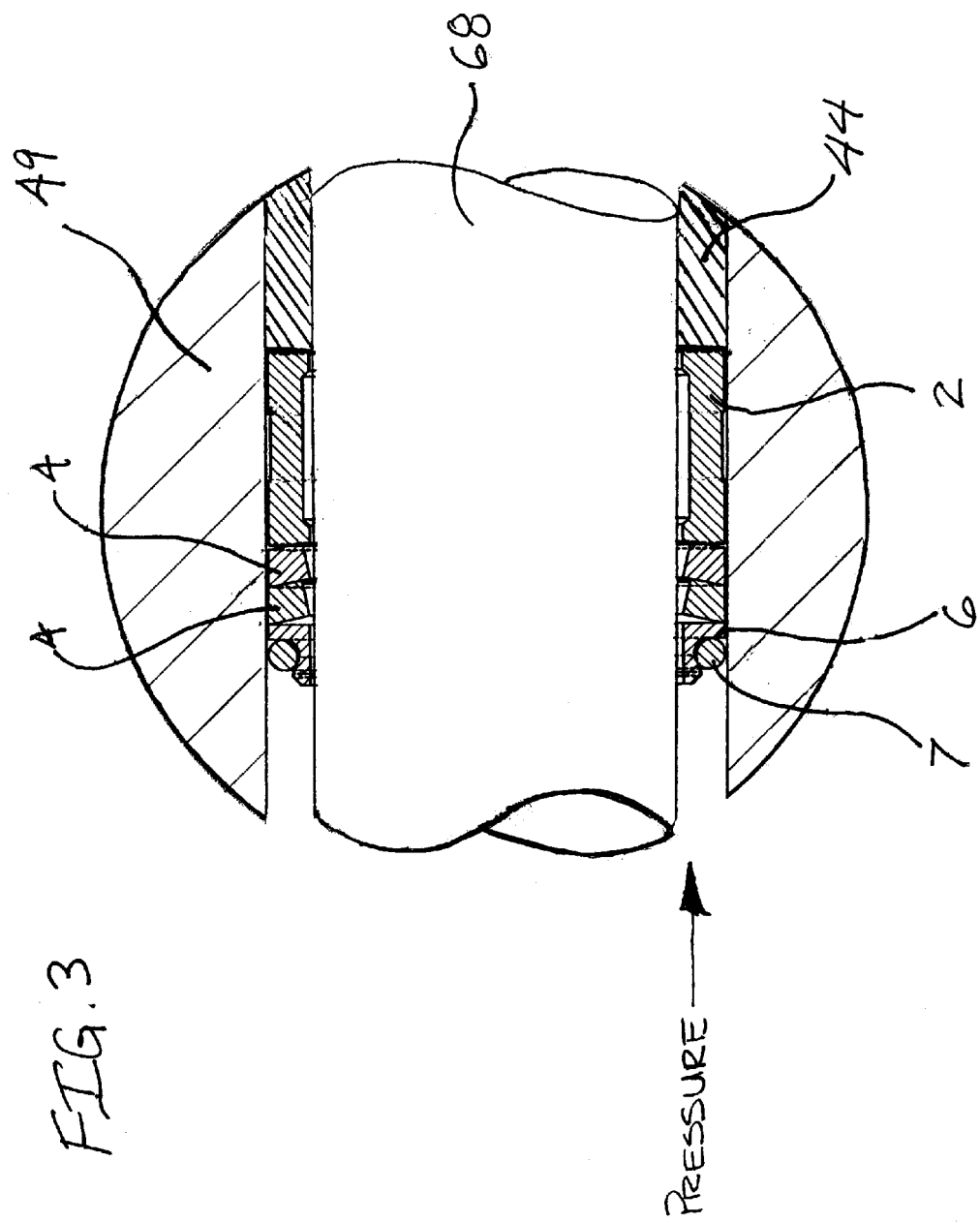
FIG. 3 is a cross-sectional view of a packing seal arrangement provided between a high pressure cylinder and plunger of a pressure intensifier having back-up rings according to the present invention.
Figure 4:
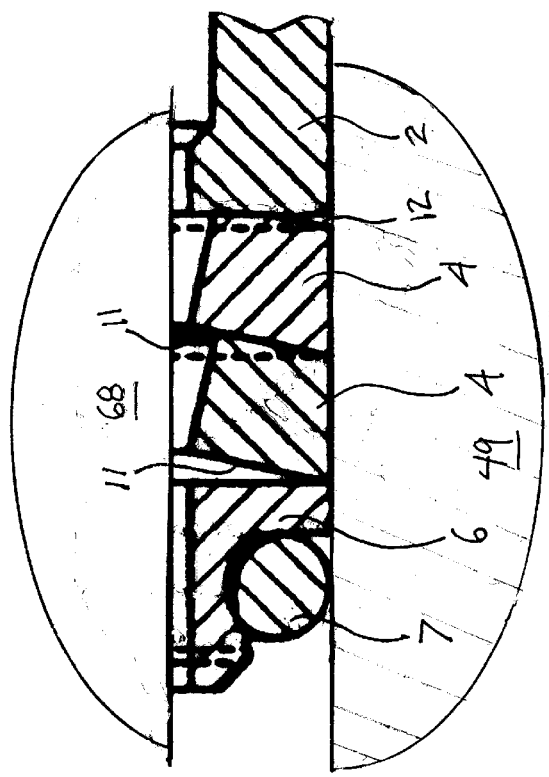
FIG. 4 is an enlarged cross-sectional view showing the packing seal arrangement of FIG. 3.
Figure 5:
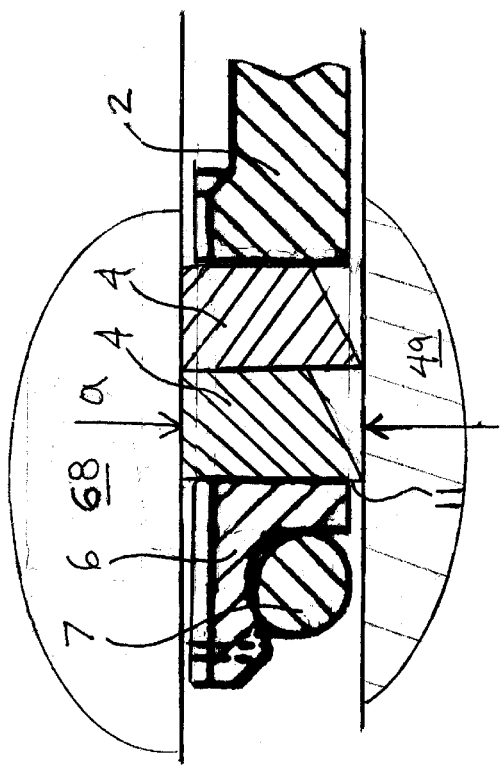
FIG. 5 is an enlarged cross-sectional view showing the packing seal arrangement shown in FIG. 4 during a pumping stroke.
Figure 6:
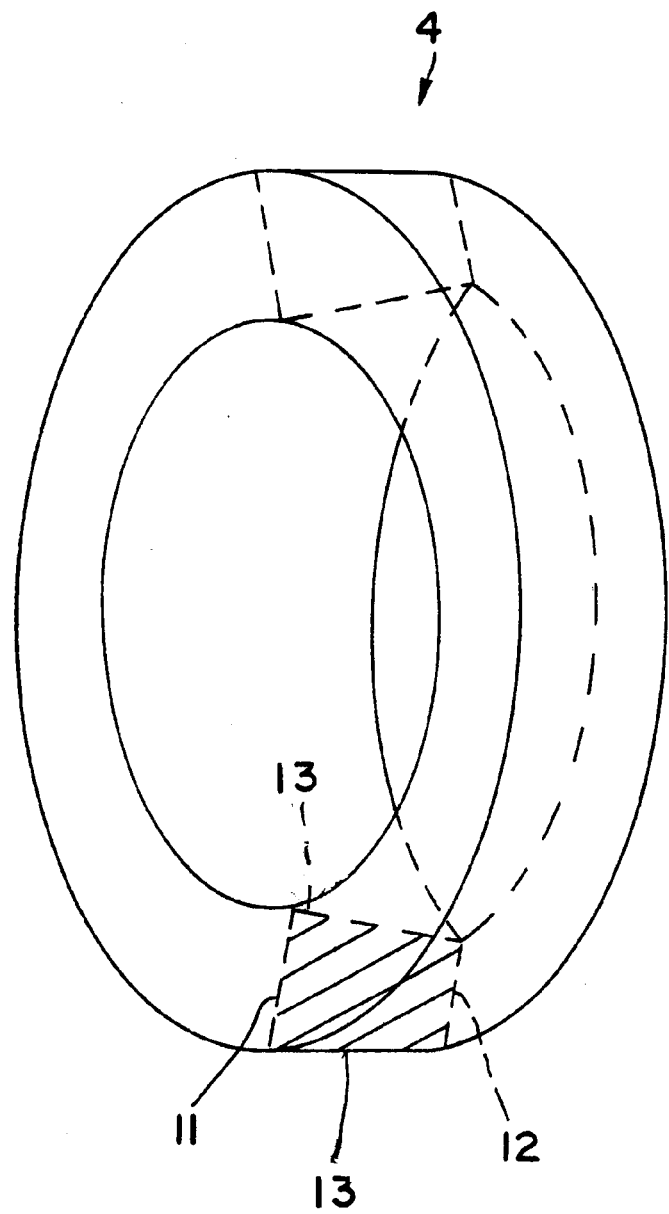
FIG. 6 is a perspective view of a back-up ring according to the present invention.

The wall thickness of the support has an angled cross-section that preferably is trapezoidal. As seen best in FIGS. 4 and 6, the frustro-conical concave and convex surfaces define parallel sides of the trapezoidal cross-section. Preferably, the first face 11 has a length that is at least as long as a gap (shown in FIG. 5 by the designation "a") defined between pump plunger 68 and high pressure cylinder 49 of a pump when under pressure. As shown in FIG. 5, during pumping the applied pressure to back-up ring 4 causes it to flatten thereby taking up any increase in clearance that may occur due to an expansion in the bore diameter of cylinder 49. As shown in FIGS. 3–5 it is preferable that the concave surface of back-up ring 4 is disposed next to seal 7 of the packing assembly.

Although one back-up ring can be used in a packing assembly, it is preferred that for even greater sealing ability, a packing assembly including two back-up rings 4 is utilized as shown to seal the gap between a pump plunger and a high pressure cylinder.

With respect to materials selections for back-up rings according to the present invention, they may be made of a flexible material that will allow the back-up ring to flatten when exposed to an applied pressure such as an acetal copolymer. An exemplary copolymer used for the back-up ring 4 is Celcon® acetal copolymer which is a polyoxymethylene (POM) available from Ticona Engineering Polymers (Celanese AG) Summit, N.J. 07901.

Most preferably, a packing assembly including at least one back-up ring 4 according to the present invention further includes a seal body 6 that engages the seal 7 and a packing follower 2 with the at least one back-up ring 4 being disposed between the seal body 6 and the packing follower 2.

Thus, back-up rings according to the present invention are provided that flatten upon the application of pressure and thereby taking up increased gaps that may occur around a pump plunger due to high pressures encountered during pumping. By reducing or eliminating these gaps, the seals last longer.

While embodiments and applications of this invention have been shown and described, it will be apparent to those skilled in the art that many more modifications are possible without departing from the inventive concepts herein described. For example, although the component parts are shown and described as having preferred dimensions and made using specific materials in certain preferred embodiments, it is envisioned that these selections may be modified. It is understood, therefore, that the invention is capable of modification and therefore is not to be limited to the precise details set forth. Rather, various modifications may be made in the details within the scope and range of equivalents of the claims without departing from the spirit of the invention.

What is claimed is:

1. A packing assembly for sealing a gap between a pump plunger and a high pressure cylinder of a pump, comprising:
    a seal and
    at least one back-up ring for said seal, said back-up ring having opposed first and
    second faces with a wall thickness having a cross-sectional shape and being physically rotatable disposed between said faces, said back-up ring having a frustro-conical concave surface on said first face and a frustro-conical convex surface on said second face and a third face wherein upon pressurization said backup ring being rotated so that the third face contacts either the plunger or the cylinder.

2. The packing assembly according to claim 1, wherein said frustro-conical concave and convex surfaces are parallel.

3. The packing assembly according to claim 1, wherein said wall thickness has a trapezoidal cross-section.

4. The packing assembly according to claim 3, wherein said frustro-conical concave and convex surfaces define parallel sides of said trapezoidal cross-section.

5. The packing assembly according to claim 4, wherein said first face has a length at least as long as a gap defined between a pump plunger and a high pressure cylinder of a pump when under pressure.

6. The packing assembly according to claim 1, further comprising a seal body engaging said seal and a packing follower, said at least one back-up ring being disposed between said seal body and said packing follower.

7. The packing assembly according to claim 1, wherein said concave surface is disposed next to said seal.

8. A reciprocating pump comprising:

a cylinder and a reciprocating plunger disposed longitudinally therein and defining a gap between said plunger and said cylinder;

a seal concentrically disposed in said gap between said plunger and said cylinder, and at least one back-up ring having opposed first and second faces with a wall thickness having a cross-sectional shape and being physically rotatable disposed between said faces, said back-up ring having a frustro-conical concave surface on said first face and a frustro-conical convex surface on said second face and a third face wherein upon pressurization said backup ring being rotated so that the third face contacts either the plunger or the cylinder.

9. The reciprocating pump according to claim 8, wherein said frustro-conical concave and convex surfaces are parallel.

10. The reciprocating pump according to claim 8, wherein said wall thickness has an angled cross-section.

11. The reciprocating pump according to claim 8, wherein said wall thickness has a trapezoidal cross-section.

12. The reciprocating pump according to claim 8, wherein said concave surface is disposed next to said seal.

13. The packing assembly according to claim 1, wherein said wall thickness has an angled cross-section.

14. The packing assembly according to claim 1, wherein said at least one back-up ring comprises two back-up rings.

* * * * *